(12) United States Patent
Endo et al.

(10) Patent No.: US 10,174,153 B2
(45) Date of Patent: Jan. 8, 2019

(54) HIGHLY SOLUBLE MODIFIED EPOXY RESIN COMPOSITION

(71) Applicant: NISSAN CHEMICAL INDUSTRIES, LTD., Tokyo (JP)

(72) Inventors: Yuki Endo, Funabashi (JP); Motohiko Hidaka, Tokyo (JP); Mikio Kasai, Tokyo (JP); Takashi Oda, Funabashi (JP); Nobuyuki Kakiuchi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/105,935

(22) PCT Filed: Dec. 10, 2014

(86) PCT No.: PCT/JP2014/082695
§ 371 (c)(1),
(2) Date: Jun. 17, 2016

(87) PCT Pub. No.: WO2015/093370
PCT Pub. Date: Jun. 25, 2015

(65) Prior Publication Data
US 2016/0340469 A1 Nov. 24, 2016

(30) Foreign Application Priority Data
Dec. 17, 2013 (JP) .................... 2013-259971

(51) Int. Cl.
*C08G 59/42* (2006.01)
*C08G 59/32* (2006.01)
(52) U.S. Cl.
CPC ......... *C08G 59/4238* (2013.01); *C08G 59/32* (2013.01); *C08G 59/3245* (2013.01); *C08G 59/4215* (2013.01)
(58) Field of Classification Search
CPC ............... C08G 59/32; C08G 59/4238; C08G 59/3245; C08G 59/4215
USPC ........................................................ 528/87
See application file for complete search history.

(56) References Cited

U.S. PATENT DOCUMENTS

| 3,496,122 | A | * | 2/1970 | Porret | ................ | C08G 59/1438 528/275 |
| 2002/0045752 | A1 | | 4/2002 | Ikeda et al. | | |
| 2010/0137475 | A1 | * | 6/2010 | Takeyama | ............. | C08G 59/42 523/212 |

FOREIGN PATENT DOCUMENTS

| EP | 2 166 037 A1 | 3/2010 |
| EP | 2 251 304 A1 | 11/2010 |
| JP | H04-81420 A | 3/1992 |
| JP | H04-264123 A | 9/1992 |
| JP | H06-68014 A | 3/1994 |
| JP | H07-62060 A | 3/1995 |
| WO | 2006/035641 A1 | 4/2006 |
| WO | 2014/109309 A1 | 7/2014 |

OTHER PUBLICATIONS

Jan. 13, 2015 Written Opinion issued in International Patent Application No. PCT/JP2014/082695.
Vargha, Viktoria., "Binary Solid-Liquid Phase Diagram of the Two Diastereomer Racemates of Triglycidyl Isocyanurate (TGIC)"., European Polymer Journal, vol. 43, pp. 4762-4769, 2007.
Jan. 13, 2015 International Search Report issued in Interntational Patent Application No. PCT/JP2014/082695.
Jun. 6, 2017 Extended European Search Report issued in European Patent Application No. 14871666.5.

* cited by examiner

Primary Examiner — David T Karst
(74) Attorney, Agent, or Firm — Oliff PLC

(57) ABSTRACT

An epoxy resin composition in a liquid or solid state having excellent solubility and having high preservation stability. A modified epoxy resin composition including: Compound A containing tris-(2,3-epoxypropyl)-isocyanurate having 1 to 3 glycidyl group(s) in a molecule substituted with a functional group(s) of Formula (1):

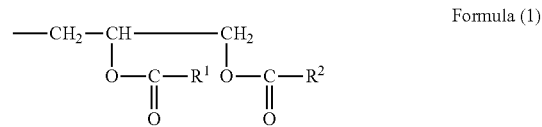

in which $R^1$ and $R^2$ are each independently an alkyl group, an alkenyl group, an alkynyl group, an aryl group, an aralkyl group, a heterocyclic group; or a halogenated derivative, an aminated derivative, or a nitrated derivative of these groups; and Compound B containing tris-(2,3-epoxypropyl)-isocyanurate, wherein tris-(2,3-epoxypropyl)-isocyanurate of Compound A before the substitution and tris-(2,3-epoxypropyl)-isocyanurate of Compound B comprise 2% by mass to 15% by mass of β-type tris-(2,3-epoxypropyl)-isocyanurate and a remaining percentage of α-type tris-(2,3-epoxypropyl)-isocyanurate based on a total mass of Compound A before the substitution and Compound B.

9 Claims, No Drawings

HIGHLY SOLUBLE MODIFIED EPOXY RESIN COMPOSITION

TECHNICAL FIELD

The present invention relates to a liquid modified epoxy resin that is modified without largely impairing inherent curing characteristics of polyfunctional epoxy resins in order to improve solubility to solvents and curing agents and preservation stability, so that an application range becomes broader.

BACKGROUND ART

Crystalline epoxy resins are used in fields that require reliable heat resistance, such as an electric/electronic field, because they commonly have rigid main chain backbones and are polyfunctional, and thus they are highly heat resistant.

However, only liquid compositions can work for certain uses such as cast molding, and thus crystalline epoxy resins are predominantly used for uses of solid materials, such as a transfer molding.

Also, epoxy resins used for liquid molding, such as cast molding, are liquid epoxy resins, which do not satisfy strict demands for improvements of curing characteristics, such as heat resistance, in recent fields of adhesion, cast molding, sealing, molding, lamination, and the like. Therefore, a demand for liquefaction of crystalline polyfunctional epoxy resins that give curing characteristics having high heat resistance has been raised. Meanwhile, a demand for stability of cured products in short wavelength regions, corresponding to white LEDs and blue LEDs, has also been raised.

Patent Document 1 describes a modified liquid epoxy resin obtained by reacting a crystalline epoxy resin with a compound that has two or more phenolic hydroxy groups and/or carboxy groups in a molecule and a compound that has one phenolic hydroxy group and/or one carboxy group in a molecule.

Patent Document 2 describes a method for manufacturing a liquid epoxy resin composition that is flowable in a room temperature, in which a mixture containing a crystalline epoxy resin and a liquid acid anhydride curing agent is melted and mixed for 10 minutes or longer at a temperature equal to or higher than the melting point of the epoxy resin to react the mixture to obtain a non-crystalline epoxy resin.

Patent Document 3 describes a tris-(2,3-epoxypropyl)-isocyanurate composition that is liquid at a room temperature, composed of: 100 parts by weight of the low melting point-type stereoisomer of tris-(2,3-epoxypropyl)-isocyanurate having a melting point of 98° C. to 107° C. and an epoxy value of 9.9 or more; and certain parts by weight of a curing agent, in which a ratio of a carboxylic anhydride to one epoxy group in a total epoxy resin is 0.5 to 1.5.

Patent Document 4 describes a method for preventing crystallization, which is for preventing solidification by recrystallization of a liquid composition containing a trivalent epoxy compound having a triazine nucleus as its backbone and an acid anhydride curing agent, characterized in that a moisture percentage in the composition is kept at 0.5% by weight or less.

Patent Document 5 describes a liquid epoxy resin composition in which a crystalline tris-(2,3-epoxypropyl)-isocyanurate having high solubility is reacted with an acid anhydride such as acetic anhydride. However, a manufacturing method of the tris-(2,3-epoxypropyl)-isocyanurate containing only α crystals, and not containing β crystals having low solubility is not described at all. In addition, in order to manufacture the tris-(2,3-epoxypropyl)-isocyanurate containing only α crystals, and not containing β crystals, recrystallization needs to be repeated to remove β crystals, which results in low recovery, and thus this is not preferable as an industrial manufacturing method.

PRIOR ART DOCUMENTS

Patent Documents

Patent Document 1: Japanese Patent Application Publication No. H7-62060 (JP 07-62060 A)
Patent Document 2: Japanese Examined Patent Application Publication No. H6-68014 (JP 06-68014 B)
Patent Document 3: Japanese Patent Application Publication No. H4-264123 (JP 04-264123 A)
Patent Document 4: Japanese Patent Application Publication No. 144-81420 (JP 04-81420 A)
Patent Document 5: International Publication WO 2006/035641 Pamphlet

SUMMARY OF THE INVENTION

Problem to be Solved by the Invention

Recently, especially in an electric/electronic field, extremely superior characteristics are required for epoxy resin cured products used, because of highly integrated circuits, uses of lead-free solder, and the like. Accordingly, the characteristics described above (heat resistance, water absorption inhibitory activity, and mechanical properties) are difficult to be satisfied with conventional modified epoxy resins.

Meanwhile, liquid epoxy resins have been conventionally used for potting, coating, casting, and the like, because of their characteristics, such as easy handling and reduced occurrence of troubles in manufacturing such as elevation of viscosity by crystallization.

Therefore, in order to obtain superior characteristics of liquid epoxy resins, a demand for liquefaction of crystalline epoxy resins, such as polyfunctional epoxy resins, which give cured products having superior physical properties, such as high heat resistance, has been raised to expand the range of uses.

Also, a demand for epoxy resins that retain heat resistance and the like as advantages of polyfunctional epoxy resin cured products, improve solubility to solvents and curing agents, and has higher preservation stability has been raised.

In order to satisfy the demanded characteristics described above, the present invention provides a liquid or solid epoxy resin composition having high solubility to solvents and curing agents and having higher preservation stability, by modifying crystalline tris-(2,3-epoxypropyl)-isocyanurate, in which the content of low-soluble β crystals is low, with an acid anhydride.

Means for Solving the Problem

The present invention is: as a first aspect, a modified epoxy resin composition characterized by comprising Compound A containing tris-(2,3-epoxypropyl)-isocyanurate having 1 to 3 glycidyl group(s) in a molecule substituted with a functional group(s) of Formula (1):

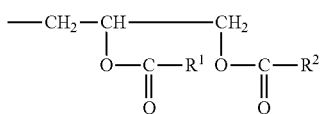

Formula (1)

(wherein, $R^1$ and $R^2$ are each independently an alkyl group, an alkenyl group, an alkynyl group, an aryl group, an aralkyl group, a heterocyclic group; or a halogenated derivative, an aminated derivative, or a nitrated derivative of these groups) and Compound B containing tris-(2,3-epoxypropyl)-isocyanurate, in which tris-(2,3-epoxypropyl)-isocyanurate of Compound A before the substitution and tris-(2,3-epoxypropyl)-isocyanurate of Compound B comprise 2% by mass to 15% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B;

as a second aspect, the modified epoxy resin composition according to the first aspect, in which a molar ratio of Compound A:Compound B is 90:10 to 30:70;

as a third aspect, the modified epoxy resin composition according to the first aspect or the second aspect, in which tris-(2,3-epoxypropyl)-isocyanurate of Compound A before the substitution and tris-(2,3-epoxypropyl)-isocyanurate of Compound B comprise 2% by mass to 10% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B;

as a fourth aspect, a method for manufacturing the modified epoxy resin composition described in any one of the first to the third aspects, comprising: separating β-type tris-(2,3-epoxypropyl)-isocyanurate contained in a tris-(2,3-epoxypropyl)-isocyanurate solution from the solution as a solid, and obtaining a crystalline body having an increased content ratio of α-type tris-(2,3-epoxypropyl)-isocyanurate from the solution, as Step (i); obtaining a tris-(2,3-epoxypropyl)-isocyanurate crystalline body having a further increased content ratio of α-type tris-(2,3-epoxypropyl)-isocyanurate from the crystalline body obtained in Step (i) by extracting β-type tris-(2,3-epoxypropyl)-isocyanurate with a solvent, as Step (ii); and reacting the tris-(2,3-epoxypropyl)-isocyanurate crystalline body obtained in Step (ii) with an acid anhydride, provided that a molar ratio of (glycidyl groups):(acid anhydrides) is 1:0.05 to 0.5, as Step (iii);

as a fifth aspect, the method for manufacturing the modified epoxy resin composition described in the fourth aspect, in which the extraction in Step (ii) is performed with a heated solvent;

as a sixth aspect, the method for manufacturing the modified epoxy resin composition described in the fourth or fifth aspect, in which the solvent in the tris-(2,3-epoxypropyl)-isocyanurate solution in Step (i) is methyl ethyl ketone, acetone, acetonitrile, ethyl acetate, or epichlorohydrin;

as a seventh aspect, the method for manufacturing the modified epoxy resin composition described in any one of the fourth to sixth aspects, in which the solvent used for extracting β-type tris-(2,3-epoxypropyl)-isocyanurate in Step (ii) is methyl ethyl ketone, acetone, methanol, ethanol, or isopropanol (2-propanol);

as an eighth aspect, the method for manufacturing the modified epoxy resin composition described in any one of the first to third aspects, comprising Steps (A), (B), (i'), and (iii) below:

Step (A): producing an epichlorohydrin adduct of cyanuric acid by reacting 1 mol of cyanuric acid with 5 mol to 180 mol of epichlorohydrin, and obtaining a solution containing tris-(2,3-epoxypropyl)-isocyanurate by dehydrochlorinating the adduct;

Step (B): adjusting a solid content concentration of the solution containing tris-(2,3-epoxypropyl)-isocyanurate obtained in Step (A) to 10% by mass to 50% by mass;

Step (i'): separating β-type tris-(2,3-epoxypropyl)-isocyanurate contained in the tris-(2,3-epoxypropyl)-isocyanurate solution obtained in Step (B) from the solution as a solid, and obtaining a tris-(2,3-epoxypropyl)-isocyanurate crystalline body having an increased content ratio of α-type tris-(2,3-epoxypropyl)-isocyanurate from the solution; and Step (iii): reacting the tris-(2,3-epoxypropyl)-isocyanurate crystalline body obtained in Step (i') with an acid anhydride, provided that a molar ratio of (glycidyl groups):(acid anhydrides) is 1:0.05 to 0.5;

as a ninth aspect, the method for manufacturing the modified epoxy resin composition described in any one of the first to third aspects, comprising Steps (A), (B), (i'), (i'), and (iii) below:

Step (A): producing an epichlorohydrin adduct of cyanuric acid by reacting 1 mol of cyanuric acid with 5 mol to 180 mol of epichlorohydrin, and obtaining a solution containing tris-(2,3-epoxypropyl)-isocyanurate by dehydrochlorinating the adduct;

Step (B): adjusting a solid content concentration of the solution containing tris-(2,3-epoxypropyl)-isocyanurate obtained in Step (A) to 10% by mass to 50% by mass;

Step (i'): separating β-type tris-(2,3-epoxypropyl)-isocyanurate contained in the tris-(2,3-epoxypropyl)-isocyanurate solution obtained in Step (B) from the solution as a solid, and obtaining a tris-(2,3-epoxypropyl)-isocyanurate crystalline body having an increased content ratio of α-type tris-(2,3-epoxypropyl)-isocyanurate from the solution;

Step (ii'): obtaining a tris-(2,3-epoxypropyl)-isocyanurate crystalline body having a further increased content ratio of α-type tris-(2,3-epoxypropyl)-isocyanurate from the crystalline body obtained in Step (i') by extracting β-type tris-(2,3-epoxypropyl)-isocyanurate with a solvent; and Step (iii): reacting the tris-(2,3-epoxypropyl)-isocyanurate crystalline body obtained in Step (ii') with an acid anhydride, provided that a molar ratio of (glycidyl groups):(acid anhydrides) is 1:0.05 to 0.5;

as a tenth aspect, the manufacturing method described in the ninth aspect, in which the extraction in Step (ii') is performed with a heated solvent;

as an eleventh aspect, the manufacturing method described in any one of the eighth to tenth aspects, in which the solvent in the tris-(2,3-epoxypropyl)-isocyanurate solution in Step (i') is epichlorohydrin; and as a twelfth aspect, the manufacturing method described in any one of the ninth to eleventh aspects, in which the solvent used for extracting β-type tris-(2,3-epoxypropyl)-isocyanurate in Step (ii') is methyl ethyl ketone, acetone, methanol, ethanol, or isopropanol.

Effects of the Invention

The modified epoxy resin composition of the present invention is liquid or solid in a room temperature. The modified epoxy resin composition is highly stable, and has high solubility and high preservation stability, while retaining heat resistance that is a characteristic of a polyfunctional epoxy resin cured product. The modified epoxy resin composition of the present invention can be used in fields of applications, such as cast molding and transfer molding.

MODES FOR CARRYING OUT THE INVENTION

A modified epoxy resin composition of the present invention is a modified epoxy resin composition comprising Compound A containing tris-(2,3-epoxypropyl)-isocyanurate having 1 to 3 glycidyl group(s) in a molecule substituted with a functional group(s) of Formula (1) and Compound B containing tris-(2,3-epoxypropyl)-isocyanurate, in which tris-(2,3-epoxypropyl)-isocyanurate of Compound A before the substitution and tris-(2,3-epoxypropyl)-isocyanurate of Compound B comprise 2% by mass to 15% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B.

More specifically, a percentage of β-type tris-(2,3-epoxypropyl)-isocyanurate contained in tris-(2,3-epoxypropyl)-isocyanurate of Compound A before the substitution and tris-(2,3-epoxypropyl)-isocyanurate of Compound B is within a range of 2% by mass to 15% by mass, 2% by mass to 10% by mass, 3% by mass to 15% by mass, 3% by mass to 10% by mass, or 4% by mass to 10% by mass based on a total mass of tris-(2,3-epoxypropyl)-isocyanurate of Compound A before the substitution and tris-(2,3-epoxypropyl)-isocyanurate of Compound B. Accordingly, a content ratio of α-type tris-(2,3-epoxypropyl)-isocyanurate contained in tris-(2,3-epoxypropyl)-isocyanurate of Compound A before the substitution and tris-(2,3-epoxypropyl)-isocyanurate of Compound B is 98% by mass to 85% by mass, 98% by mass to 90% by mass, 97% by mass to 85% by mass, 97% by mass to 90% by mass, or 96% by mass to 90% by mass based on a total mass of tris-(2,3-epoxypropyl)-isocyanurate of Compound A before the substitution and tris-(2,3-epoxypropyl)-isocyanurate of Compound B.

The β-type tris-(2,3-epoxypropyl)-isocyanurate herein is a high melting point-type crystal the melting point of which is about 150° C., having extremely low solubility, and thus a content thereof is preferably 15% by mass or less. A content over 15% by weight is not preferable because solubility to a solvent becomes extremely low. Meanwhile, if a content of β-type tris-(2,3-epoxypropyl)-isocyanurate is too low, that is, less than 2% by mass, a melting point becomes high and the solubility decreases. That is, highly pure α-bodies induce high crystallinity, which in turn induces not only decrease of a rate of dissolution, but also decrease of the solubility. In addition, repeated recrystallization is required in order to remove β-type tris-(2,3-epoxypropyl)-isocyanurate until a content thereof becomes less than 2% by mass, which results in low recovery, and thus this method is not preferable for industrial manufacturing.

Therefore, in the present invention, a content of β-type tris-(2,3-epoxypropyl)-isocyanurate in tris-(2,3-epoxypropyl)-isocyanurate having an increased content ratio of α-type tris-(2,3-epoxypropyl)-isocyanurate of Compound A before the substitution and of Compound B, is 2% by weight to 15% by weight based on a total mass of tris-(2,3-epoxypropyl)-isocyanurate of Compound A before the substitution and tris-(2,3-epoxypropyl)-isocyanurate of Compound B, and is preferably 2% by mass to 10% by mass, and preferably 3% by mass to 10% by mass. Preferable ranges from the point of view of satisfying both a melting point that is preferred for use and high solubility are 4% by mass to 10% by mass, 4% by mass to 8% by mass, 2% by mass to 10% by mass, or 2% by mass to 8% by mass.

Preparation of tris-(2,3-epoxypropyl)-isocyanurate used for a modified epoxy resin composition of the present invention comprises the steps of below. First, the preparation comprises Step (i), in which separating β-type tris-(2,3-epoxypropyl)-isocyanurate contained in a tris-(2,3-epoxypropyl)-isocyanurate solution from the solution as a solid, and obtaining a crystalline body having an increased content ratio of α-type tris-(2,3-epoxypropyl)-isocyanurate from the solution.

Specifically, a crystalline body having an increased content ratio of α-type tris-(2,3-epoxypropyl)-isocyanurate of the present invention can be obtained by separating β-type tris-(2,3-epoxypropyl)-isocyanurate as a component insoluble to a solvent. Tris-(2,3-epoxypropyl)-isocyanurate usually contains 25% by mass of β-type tris-(2,3-epoxypropyl)-isocyanurate. That is, the crystalline body can be obtained by dissolving tris-(2,3-epoxypropyl)-isocyanurate whose main component is the α-type in a solvent; filtrating β-type tris-(2,3-epoxypropyl)-isocyanurate that has not been dissolved; and removing the solvent from the solution.

Although the solvent used herein is not limited, a preferable solvent has high solubility to α-type tris-(2,3-epoxypropyl)-isocyanurate, and has low solubility to β-type tris-(2,3-epoxypropyl)-isocyanurate. That is, a preferable solvent is a solvent in which there is a large difference between solubility values of both types.

Examples of the solvent include methyl ethyl ketone, acetone, acetonitrile, ethyl acetate, and epichlorohydrin.

Following the description above, the preparation comprises Step (ii), in which obtaining a tris-(2,3-epoxypropyl)-isocyanurate crystalline body having a further increased content ratio of α-type tris-(2,3-epoxypropyl)-isocyanurate from the crystalline body having an increased content ratio of α-type tris-(2,3-epoxypropyl)-isocyanurate obtained in Step (i) by extracting β-type tris-(2,3-epoxypropyl)-isocyanurate with a solvent.

The extraction in Step (ii) can be performed with a heated solvent.

A temperature for heating the solvent is from a temperature 10° C. or more higher than a room temperature to a temperature equal to, or less than a boiling point of the solvent used at normal pressures. Preferably, the temperature for heating is a temperature around a boiling point of the solvent used at normal pressures.

That is, in Step (ii), a crystalline body having an increased content ratio of α-type tris-(2,3-epoxypropyl)-isocyanurate can be manufactured by extracting β-type tris-(2,3-epoxypropyl)-isocyanurate with a solvent from a crystalline body having an increased content ratio of α-type tris-(2,3-epoxypropyl)-isocyanurate containing 15% by mass or less of β-type tris-(2,3-epoxypropyl)-isocyanurate obtained by the method of Step (i). Accordingly, herein, the content ratio of α-type tris-(2,3-epoxypropyl)-isocyanurate can be increased by removing β-type tris-(2,3-epoxypropyl)-isocyanurate by extraction with a solvent having a smaller difference between the solubility of α-type tris-(2,3-epoxypropyl)-isocyanurate and that of β-type tris-(2,3-epoxypropyl)-isocyanurate.

For example, fractional crystallizing the β-type by using a solvent having a large difference of about 20:1 between solubility of the α-type and that of the β-type, such as acetone; and concentrating a filtrate to obtain a crystalline body having a ratio by weight of 94:6 between α-type tris-(2,3-epoxypropyl)-isocyanurate and β-type tris-(2,3-epoxypropyl)-isocyanurate. After that, performing solvent extraction to the crystal with a solvent such as methyl ethyl ketone, acetone, methanol, ethanol, and isopropanol, particularly heated methanol and heated acetone having a smaller difference of about 10:1 between the solubility of the α-type and that of the β-type, to obtain a crystalline body having an increased content ratio of α-type tris-(2,3-epoxypropyl)-isocyanurate having a ratio by weight of 96:4 between α-type tris-(2,3-epoxypropyl)-isocyanurate and β-type tris-(2,3-epoxypropyl)-isocyanurate.

The crystalline body having an increased content ratio of α-type tris-(2,3-epoxypropyl)-isocyanurate can be obtained also by simultaneously combining the methods above.

For example, the crystalline body having an increased content ratio of α-type tris-(2,3-epoxypropyl)-isocyanurate can be obtained by once extracting α-type tris-(2,3-epoxypropyl)-isocyanurate with a solvent; filtrating β-type tris-(2,3-epoxypropyl)-isocyanurate; concentrating the solvent of the filtrate to precipitate α-type tris-(2,3-epoxypropyl)-isocyanurate; and filtering crystals. In this case, a crystalline body having an increased content ratio of α-type tris-(2,3-epoxypropyl)-isocyanurate containing 2% by weight to 15% by weight of β-type tris-(2,3-epoxypropyl)-isocyanurate can be obtained more efficiently, by utilizing the difference of between the solubility of α-type tris-(2,3-epoxypropyl)-isocyanurate and the solubility of β-type tris-(2,3-epoxypropyl)-isocyanurate depending on each temperature.

In the present invention, a highly pure α-type tris-(2,3-epoxypropyl)-isocyanurate crystalline body can also be finally manufactured through steps for manufacturing tris-(2,3-epoxypropyl)-isocyanurate.

That is, the manufacturing comprises Steps (A), (B), and (i') below:

Step (A): producing an epichlorohydrin adduct of isocyanuric acid by reacting 1 mol of isocyanuric acid with 5 mol to 180 mol of epichlorohydrin, and obtaining a solution containing tris-(2,3-epoxypropyl)-isocyanurate by dehydrochlorinating the adduct;

Step (B): adjusting a solid content concentration of the solution containing tris-(2,3-epoxypropyl)-isocyanurate obtained in Step (A) to 10% by mass to 50% by mass;

Step (i'): separating β-type tris-(2,3-epoxypropyl)-isocyanurate contained in the tris-(2,3-epoxypropyl)-isocyanurate solution obtained in Step (B) from the solution as a solid, and obtaining a tris-(2,3-epoxypropyl)-isocyanurate crystalline body having an increased content ratio of α-type tris-(2,3-epoxypropyl)-isocyanurate from the solution.

Following Step (i'), the manufacturing further comprises Step (ii'), in which obtaining a crystalline body of tris-(2,3-epoxypropyl)-isocyanurate having a further increased content ratio of α-type tris-(2,3-epoxypropyl)-isocyanurate from the crystalline body having an increased content ratio of α-type tris-(2,3-epoxypropyl)-isocyanurate obtained in Step (i') by extracting β-type tris-(2,3-epoxypropyl)-isocyanurate with a solvent.

The extraction in Step (ii') can be performed with a heated solvent.

A temperature for heating the solvent is from a temperature 10° C. or more higher than a room temperature to a temperature equal to, or less than a boiling point of the solvent used at normal pressures. Preferably, the temperature for heating is a temperature around a boiling point of the solvent used at normal pressures.

Examples of the solvent used in Step (i') include epichlorohydrin.

Examples of the solvent used in Step (ii') include methyl ethyl ketone, acetone, methanol, ethanol, and isopropanol.

A modified epoxy resin composition of the present invention is a mixture of Compound A comprising tris-(2,3-epoxypropyl)-isocyanurate in which a glycidyl group(s) of tris-(2,3-epoxypropyl)-isocyanurate having an increased content ratio of the α-type tris-(2,3-epoxypropyl)-isocyanurate is(are) substituted with a functional group(s) of Formula (1) and Compound B comprising tris-(2,3-epoxypropyl)-isocyanurate having an increased content ratio of the α-type tris-(2,3-epoxypropyl)-isocyanurate.

In a modified epoxy resin composition of the present invention, a molar ratio of Compound A:Compound B can be 90:10 to 30:70.

Compound A is a mixture of a compound in which one acid anhydride of Formula (2) below is added to a glycidyl group of tris-(2,3-epoxypropyl)-isocyanurate having an increased content ratio of α-type tris-(2,3-epoxypropyl)-isocyanurate; a compound in which two acid anhydrides of Formula (2) below is added to glycidyl groups of tris-(2,3-epoxypropyl)-isocyanurate having an increased content ratio of α-type tris-(2,3-epoxypropyl)-isocyanurate; and a compound in which three acid anhydrides of Formula (2) below is added to glycidyl groups of tris-(2,3-epoxypropyl)-isocyanurate having an increased content ratio of α-type tris-(2,3-epoxypropyl)-isocyanurate.

The modified epoxy resin composition of the present invention can be obtained by reacting glycidyl groups in tris-(2,3-epoxypropyl)-isocyanurate having an increased content ratio of α-type tris-(2,3-epoxypropyl)-isocyanurate with acid anhydrides with a molar ratio of 1:0.05 to 0.5.

Compound A preferably remains as the mixture of a compound in which one acid anhydride of Formula (2) below is added to a glycidyl group of tris-(2,3-epoxypropyl)-isocyanurate; a compound in which two acid anhydrides of Formula (2) below are added to glycidyl groups of tris-(2,3-epoxypropyl)-isocyanurate; and a compound in which three acid anhydrides of Formula (2) below are added to glycidyl groups of tris-(2,3-epoxypropyl)-isocyanurate.

That is, the modified epoxy resin composition of the present invention is preferably manufactured by reacting the tris-(2,3-epoxypropyl)-isocyanurate crystalline body obtained in Step (i'), Step (ii), or (ii') with an acid anhydride, provided that a molar ratio of glycidyl groups of tris-(2,3-epoxypropyl)-isocyanurate:acid anhydrides is 1:0.05 to 0.5, as Step (iii). It is preferable that the modified epoxy resin composition containing a mixture (Compound A) of a compound in which one acid anhydride of Formula (2) below is added to a glycidyl group of tris-(2,3-epoxypropyl)-isocyanurate; a compound in which two acid anhydrides of Formula (2) below are added to glycidyl groups of tris-(2,3-epoxypropyl)-isocyanurate; and a compound in which three acid anhydrides of Formula (2) below are added to glycidyl groups of tris-(2,3-epoxypropyl)-isocyanurate and tris-(2,3-epoxypropyl)-isocyanurate (Compound B) with a molar ratio of 90:10 to 30:70 for (Compound A):(Compound B) is obtained.

Here, the acid anhydride [Formula (2)] used for manufacturing a modified epoxy resin composition of the present invention is what is called an acid anhydride obtained from two molecules of a monocarboxylic acid, and this acid anhydride does not function as a curing agent of epoxy resins, unlike an acid anhydride that is obtained from a dicarboxylic acid and is used as a curing agent of epoxy resins.

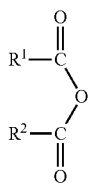

Formula (2)

(wherein, $R^1$ and $R^2$ have the same meaning as those in Formula (1).)

The average total number of glycidyl groups in synthesized Compound A and glycidyl groups in Compound B is preferably two or more in terms of one molecule (dividing the total number of glycidyl groups by the total number of molecules). The number of less than two is not preferable because physical properties of cured products, particularly heat resistance, are decreased.

Although the acid anhydride [Formula (2)] used in the present invention is not particularly limited, $R^1$ and $R^2$ are each independently an alkyl group, an alkenyl group, an alkynyl group, an aryl group, an aralkyl group, a heterocyclic group; or a halogenated derivative group, an aminated derivative group, or a nitrated derivative group thereof. Examples of the alkyl group include $C_{1-18}$ alkyl groups such as methyl group, ethyl group, n-propyl group, isopropyl group, n-butyl group, isobutyl group, t-butyl group, n-heptyl group, and cyclohexyl group. Examples of the alkenyl group include $C_{2-6}$ alkenyl groups such as vinyl group, 1-propenyl group, and 2-propenyl group. Examples of the alkynyl group include $C_{2-6}$ alkynyl groups such as ethynyl group and propargyl group. Examples of the aryl group include $C_{6-20}$ aryl groups such as phenyl group, tolyl group, naphthyl group, methylnaphthyl group, anthryl group, and ethylanthryl group. Examples of the aralkyl group include $C_{7-22}$ aralkyl groups such as benzyl group, phenethyl group, naphthylmethyl group, naphthylethyl group, anthryl group, and anthrylmethyl group. Examples of the heterocyclic group include imidazole group, pyrazole group, pyridazine group, pyrimidine group, quinoline group, benzoxazol group, thiophene group, dithiol group, thiazole group, thiadiazole group, and benzothiazole group. Each of these groups including an alkyl group, an alkenyl group, an alkynyl group, an aryl group, an aralkyl group, and a heterocyclic group can be used as a halogenated (fluorinated, chlorinated, brominated, or iodinated) derivative group, an aminated derivative group, or a nitrated derivative group. Examples thereof include chloromethyl group, dichloromethyl group, trichloromethyl group, trifluoromethyl group, aminophenyl group, and nitrobenzyl group. $R^1$ and $R^2$ may be same or different. Note that the examples of $R^1$ and $R^2$ in Formula (2) are also examples of $R^1$ and $R^2$ in Formula (1), in which $R^1$ and $R^2$ in Formula (1) are functional groups whereby tris-(2,3-epoxypropyl)-isocyanurate is substituted.

Examples of the acid anhydride of Formula (2) containing $R^1$ and $R^2$ include acetic anhydride, propionic anhydride, n-butyric anhydride, n-valeric anhydride, n-hexanoic anhydride, and trifluoroacetic anhydride. $R^1$ and $R^2$ in Formula (1) are determined depending on the acid anhydride [Formula (2)], and the $R^1$ and $R^2$ are each preferably a $C_{1-5}$ hydrocarbon group.

Next, the reaction between tris-(2,3-epoxypropyl)-isocyanurate and an acid anhydride will be explained in more detail.

A solvent used in the reaction only needs to be inactive to the reaction. Representative examples of the solvent include ketones, such as acetone and methyl ethyl ketone; nitriles, such as acetonitrile; ethers, such as tetrahydrofuran and dioxane; esters, such as ethyl acetate; aromatic hydrocarbons, such as chlorobenzene and toluene; and halogenated hydrocarbons, such as chloroform and dichloroethane. These solvents can be used singly, or can be used as a mixed solvent thereof to dissolve tris-(2,3-epoxypropyl)-isocyanurate. If necessary, a tertiary amine, such as triethylamine, tripropylamine, and 1,8-diazabicyclo-5,4,0-undecan-7-ene; a quaternary phosphonium salt, such as a halogenated triphenyl monoalkyl phosphonium represented by triphenylethylphosphonium bromide and the like; an imidazole compound, such as 2-ethyl-4-methyl imidazole; a quaternary ammonium salt, such as tetraethylammonium bromide; or a phosphorus compound, such as triphenylphosphine can be used as a catalyst.

The reaction temperature is from 60° C. to the reflux temperature of a solvent, and the reaction continues until the peak of an added acid anhydride disappears as determined by a GC analysis. After the reaction is ended, the solvent is distilled away to obtain a modified epoxy resin composition.

The result of a GC analysis showed that the obtained modified epoxy resin composition contained a mixture of a compound in which one acid anhydride of Formula (2) below is added to a glycidyl group of tris-(2,3-epoxypropyl)-isocyanurate; a compound in which two acid anhydrides of Formula (2) below are added to glycidyl groups of tris-(2,3-epoxypropyl)-isocyanurate; and a compound in which three acid anhydrides of Formula (2) below are added to glycidyl groups of tris-(2,3-epoxypropyl)-isocyanurate (Compound A) and unreacted tris-(2,3-epoxypropyl)-isocyanurate (Compound B).

Unlike the case where a monocarboxylic acid is added to an epoxy resin, hydroxy group generated by ring-opening of an epoxy group does not exist in the present invention, and thus gelation does not occur even if the present invention is stored after being mixed with an acid anhydride curing agent. In contrast, there has been a problem, that is, hydroxy group, which is generated by ring-opening of an epoxy group that is partially modified with a monocarboxylic acid, facilitates a reaction when trying to obtain a cured product by using an acid anhydride curing agent, and thus gelation cannot be prevented even if a composition is stored after dissolving it in an acid anhydride curing agent. In addition, unlike an dicarboxylic acid anhydride that is usually used as a curing agent of epoxy resins, an acid anhydride of a modified compound used in the present invention is modified tris-(2,3-epoxypropyl)-isocyanurate after reaction with tris-(2,3-epoxypropyl)-isocyanurate, and thus it is not reacted during storage, not reacted or gelated upon heating.

In addition, advantages to use tris-(2,3-epoxypropyl)-isocyanurate as an epoxy resin having high crystallinity are that the tris-(2,3-epoxypropyl)-isocyanurate gives a cured product that is not only heat resistant, but also weather resistant, light resistant, and highly transparent. That is, because tris-(2,3-epoxypropyl)-isocyanurate has a triazine backbone, UV absorption is small, and oxidative decomposition does not easily occur in the tris-(2,3-epoxypropyl)-isocyanurate compared to many epoxy resins having aromatic rings, and thus the cured product is colored little by UV irradiation, and is highly transparent.

Also, because glycidyl group is partially modified, characteristics such as water absorbability and mechanical strength, which are disadvantages of polyfunctional epoxy cured products, are improved. That is, a cured product utilizing a modified epoxy resin composition of the present invention has low water absorbability, and high mechanical strength while keeping high heat resistance.

If necessary, the modified epoxy resin composition of the present invention can be used by mixing with a liquid acid anhydride curing agent, and dissolving the composition in the agent. The liquid acid anhydride used herein is an acid anhydride usually used as a curing agent for epoxy resins. As the liquid acid anhydride, for example, at least one selected from the group consisting of methyl himic acid anhydride, methyl hexahydro phthalic acid anhydride, and methyl tetrahydro phthalic acid anhydride is used, and the anhydride can be used singly, or as a combination of two or more of them.

The modified epoxy resin composition of the present invention can be used as dissolved in a commercially available epoxy resin that is liquid at a room temperature. Although any mixing ratio can be taken, when a modified epoxy resin composition of the present invention is 100 parts by weight, a liquid epoxy resin is preferably 100 parts by weight or less. If the liquid epoxy resin is over 100 parts by weight, characteristics which the modified epoxy resin composition of the present invention inherently has become weak. Although the epoxy resin that is liquid at a room temperature used herein is not particularly limited, examples thereof include a bisphenol-A-type liquid epoxy resin, a bisphenol-F-type liquid epoxy resin, a hexahydro bisphenol-A-type liquid epoxy resin, and a dimer acid diglycidyl ester.

A curing agent that is usually used for epoxy resins can be used as a curing agent for curing a modified epoxy resin composition of the present invention. Examples thereof include phenol resins, such as phenol novolac resins and cresol novolac resins; acid anhydrides, such as methyl himic acid anhydride, methyl hexahydro phthalic acid anhydride, hexahydro phthalic acid anhydride, methyl tetrahydro phthalic acid anhydride, tetrahydro phthalic acid anhydride, and pyromellitic acid anhydride; and amines, such as diethylenetriamine, isophoronediamine, diaminodiphenylmethane, and diaminodiphenylsulfone.

Also, when obtaining the cured product described above, a curing accelerator can suitably be combined. Examples of the curing accelerator include imidazoles, such as 2-methyl imidazole and 2-ethyl-4 methyl imidazole; amines, such as 2,4,6-tris(dimethylaminomethyl)phenol and benzyldimethylamine; organophosphorus compounds, such as triphenylphosphine and tributylphosphine; and quaternary phosphonium salts, such as halogenated triphenyl monoalkyl phosphoniums represented by triphenylethylphosphonium bromide and the like.

EXAMPLES

The following are devices used for analyzing samples.
HPLC
  Device: LC-20A system manufactured by SHIMADZU Corporation (analysis of compositions of α-type and β-type)
GC
  Device: GC-2010 system manufactured by SHIMADZU Corporation (analysis of compositions after modifications)
Viscosity measurement: E-type viscometer (VISCONIC ED) manufactured by TOKIMEC INC.
Transmittance measurement: UV-Vis-NIR spectrophotometer (UV-3600) manufactured by SHIMADZU Corporation
Bending test: Precision universal tester (AGS-X series) manufactured by SHIMADZU Corporation Coefficient of linear expansion, glass transition temperature measurement:
Thermomechanical analyzer (TMA Q400) manufactured by TA Instruments <Method for Measuring Proportion of α-type and β-type of Tris-(2,3-epoxypropyl)-isocyanurate>

HPLC was performed by using a commercially available column for optical resolution whose product name is CHIRALPAK AS-3 (manufactured by Daicel Corporation (0.46 cm diameter×10 cm long)) and n-hexane/ethanol (60/40 w/w) as an eluant, in the condition of 40° C. for a column temperature and 0.4 ml/minute for flux. The crystals in a sample were dissolved in acetonitrile, and the solution was further diluted with the eluant. The diluted solution was injected into HPLC to be separated by chromatography. The β-type tris-(2,3-epoxypropyl)-isocyanurate is eluted at 11.1 minutes and 13.2 minutes; and the α-type tris-(2,3-epoxypropyl)-isocyanurate is eluted at 11.7 minutes and 12.4 minutes. The proportion of α-type or β-type in the total crystals was calculated by the area ratio of each of the peaks.

<Method for Measuring Proportion of Tris-(2,3-epoxypropyl)-isocyanurate and Modified Product Thereof GC was performed by using a commercially available column whose product name is HP-5 (manufactured by Agilent Technologies, Inc.) (30 m×0.32 mm×0.25 μm), in the condition of 250° C. for an injector temperature, 300° C. for a detector temperature, 40° C. (5 minutes)→20° C./minute→300° C. (12 minutes) for oven temperatures, a carrier gas: nitrogen, 89.1 kPa for gas pressure, 74.4 ml/minute for total flux, 3.4 ml/minute for column flux, and 50 cm/second for linear velocity. Samples were dissolved in acetonitrile for measurements. Tris-(2,3-epoxypropyl)-isocyanurate was detected at 16.5 minutes, one adduct of propionic anhydride to tris-(2,3-epoxypropyl)-isocyanurate was detected at 18.4 minutes, two adducts of propionic anhydride to tris-(2,3-epoxypropyl)-isocyanurate were detected at 20.9 minutes, and three adducts of propionic anhydride to tris-(2,3-epoxypropyl)-isocyanurate were detected at 25.1 minutes. The proportion of tris-(2,3-epoxypropyl)-isocyanurate and each of the modified products thereof was calculated by the area ratio of each of the peaks.

Synthesis Example 1

To a reaction flask having an inner volume of 2 liters and equipped with a stirrer, 30 g of water, 5.5 g of tetramethylammonium chloride, 1,388 g (15 mol) of epichlorohydrin, and 129 g (1 mol) of isocyanuric acid were placed to form a reaction mixture. Next, the reaction mixture in the flask was heated with stirring to elevate a temperature. When the temperature of the reaction mixture reached 89° C., the reaction mixture started to be boiled under atmospheric pressure; however, the reaction mixture was continued to be heated. Generated steam was cooled in a condenser, all of liquefied epichlorohydrin was sequentially refluxed in the flask, and liquefied water was discharged out of the flask. These processes were performed to be continued for five hours to allow the temperature of the reaction mixture to reach 120° C. Then heating was stopped at this time point, and the reaction mixture was cooled to obtain a reaction product whose temperature was 45° C. Unreacted isocyanuric acid was not detected in this product.

Next, as the entire reaction product in the flask was kept at 50° C., dropping of 256 g (3.2 mol as NaOH) of a 50% by mass sodium hydroxide aqueous solution to the reaction product was started under 100 mmHg of reduced pressure to form a reaction mixture. At the same time, water and epichlorohydrin were allowed to be evaporated from the reaction mixture with stirring vigorously. As gradually increasing the degree of reduced pressure, steam was cooled in a condenser, all of liquefied epichlorohydrin was sequentially refluxed in the flask, and liquefied water was discharged out of the flask. As continuing these processes, dropping was stopped when the degree of reduced pressure reached 60 mmHg to obtain slurry containing precipitated sodium chloride. Six hours have passed from the beginning to ending of the dropping. During the six hours, the stirred reaction mixture was kept homogeneous, while it became clouded by precipitated sodium chloride. According to a liquid chromatography analysis, a content of the compound having a 2-hydroxy-3-chlorpropyl group in the obtained slurry was 1% or less.

The obtained tris-(2,3-epoxypropyl)-isocyanurate was (in crystalline bodies, the mass ratio of α crystals:β crystals=75:25).

Synthesis Example 2

80.0 kg (269 mol) of the highly pure tris-(2,3-epoxypropyl)-isocyanurate manufactured in Synthesis Example 1 and 680 kg of acetone were mixed, and stirred at 9° C. After that, crystals were filtered to obtain a filtrate containing a high proportion of the α-type. The filtrate was vacuum concentrated at 40° C., 243 kg of methanol was added thereto, and the mixture was cooled to 20° C. After that, the mixture was filtered, and the obtained crystals were vacuum dried to obtain 37.3 kg (125 mol) of tris-(2,3-epoxypropyl)-isocyanurate (in crystalline bodies, the mass ratio of α crystals:β crystals=98:2).

Synthesis Example 3

5.0 g (17 mmol) of the highly pure tris-(2,3-epoxypropyl)-isocyanurate manufactured in Synthesis Example 1 and 42.5 g of epichlorohydrin were mixed, and stirred at 6° C. After that, crystals were filtered to obtain a filtrate containing a high proportion of the α-type. 785 g of methanol was added thereto, and the mixture was cooled to −78° C. After that, the mixture was filtered, and the obtained crystals were vacuum dried to obtain 3.2 g (11 mmol) of tris-(2,3-epoxypropyl)-isocyanurate (in crystalline bodies, the mass ratio of α crystals:β crystals=92:8).

Synthesis Example 4

42.5 g of tris-(2,3-epoxypropyl)-isocyanurate (the mass ratio of a crystals:β crystals=98:2) manufactured in Synthesis Example 2, 11.0 g of acetonitrile, 7.63 g (the molar ratio of glycidyl groups:acid anhydrides=1:0.13) of propionic anhydride, and 23.8 mg of ethyl triethyl phosphonium bromide were mixed, and stirred at 100° C. for 2 hours. After that, the mixture was vacuum concentrated to obtain 47.8 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 39.7:8.1:0.4:51.8 (a molar ratio of Compound A:Compound B=48.2:51.8). The epoxy equivalent was 138.1 g/eq, viscosity was 4,090 mPa·s at 60° C. This epoxy resin composition was designated as (i-1).

Synthesis Example 5

42.5 g of tris-(2,3-epoxypropyl)-isocyanurate (the mass ratio of a crystals:β crystals=98:2) manufactured in Synthesis Example 2, 11.0 g of acetonitrile, 11.2 g (the molar ratio of glycidyl groups:acid anhydrides=1:0.20) of propionic anhydride, and 23.8 mg of ethyl triethyl phosphonium bromide were mixed, and stirred at 100° C. for 4 hours. After that, the mixture was vacuum concentrated to obtain 52.4 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 46.0:14.5:1.3:38.2 (a molar ratio of Compound A:Compound B=61.8:38.2). The epoxy equivalent was 157.2 g/eq, viscosity was 3,344 mPa·s at 60° C. This epoxy resin composition was designated as (i-2).

Synthesis Example 6

85.0 g of tris-(2,3-epoxypropyl)-isocyanurate (the mass ratio of α crystals:β crystals=98:2) manufactured in Synthesis Example 2, 46.8 g of toluene, 29.8 g (the molar ratio of glycidyl groups:acid anhydrides=1:0.27) of propionic anhydride, and 48.6 mg of ethyl triethyl phosphonium bromide were mixed, and stirred at 100° C. for 8 hours, and 120° C. for 3 hours. After that, the mixture was vacuum concentrated to obtain 112.8 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 52.5:22.3:2.2:23.1 (a molar ratio of Compound A:Compound B=76.9:23.1). The epoxy equivalent was 177.4 g/eq, viscosity was 2,610 mPa·s at 60° C. This epoxy resin composition was designated as (i-3).

Synthesis Example 7

2.70 g of tris-(2,3-epoxypropyl)-isocyanurate (the mass ratio of a crystals:β crystals=92:8) manufactured in Synthesis Example 3, 0.71 g of acetonitrile, 0.49 g (the molar ratio of glycidyl groups:acid anhydrides=1:0.13) of propionic anhydride, and 1.5 mg of ethyl triethyl phosphonium bromide were mixed, and stirred at 110° C. for 6 hours. After that, the mixture was vacuum concentrated to obtain 2.97 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 40.2:5.0:0.2:54.6 (a molar ratio of Compound A:Compound B=45.4:54.6). The epoxy equivalent was 134.4 g/eq, viscosity was 4, 280 mPa·s at 60° C. This epoxy resin composition was designated as (i-4).

Reference Example 1

42.5 g of tris-(2,3-epoxypropyl)-isocyanurate (the mass ratio of α-types:β-types=75:25) manufactured in Synthesis Example 1, 11.0 g of acetonitrile, 7.63 g (the molar ratio of glycidyl groups:acid anhydrides=1:0.13) of propionic anhydride, and 23.8 mg of ethyl triethyl phosphonium bromide were mixed, and stirred at 100° C. for 2 hours. After that, the mixture was vacuum concentrated to obtain 48.3 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 37.7: 7.9:0.6:53.8 (a molar ratio of Compound A:Compound B=46.2:53.8). The epoxy equivalent was 136.4 g/eq, viscosity was 4,640 mPa·s at 60° C. This epoxy resin composition was designated as (i-5).

Reference Example 2

42.5 g of tris-(2,3-epoxypropyl)-isocyanurate (the mass ratio of α-types:β-types=75:25) manufactured in Synthesis Example 1, 11.0 g of acetonitrile, 11.2 g (the molar ratio of glycidyl groups:acid anhydrides=1:0.20) of propionic anhydride, and 23.8 mg of ethyl triethyl phosphonium bromide were mixed, and stirred at 100° C. for 4 hours. After that, the mixture was vacuum concentrated to obtain 52.1 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 45.2: 14.3:1.5:39.1 (a molar ratio of Compound A:Compound B=60.9:39.1). The epoxy equivalent was 157.9 g/eq, viscosity was 3,748 mPa·s at 60° C. This epoxy resin composition was designated as (i-6).

Reference Example 3

85.0 g of tris-(2,3-epoxypropyl)-isocyanurate (the mass ratio of α-types:β-types=75:25) manufactured in Synthesis Example 1, 46.8 g of toluene, 29.8 g (the molar ratio of glycidyl groups:acid anhydrides=1:0.27) of propionic anhydride, and 48.6 mg of ethyl triethyl phosphonium bromide were mixed, and stirred at 100° C. for 8 hours and 120° C. for 1 hour. After that, the mixture was vacuum concentrated to obtain 113.3 g of a liquid modified epoxy resin composition.

As a result of a GC analysis, a molar ratio of one adduct of propionic anhydride to tris-(2,3-epoxypropyl)-isocyanurate, two adducts of propionic anhydride to tris-(2,3-epoxypropyl)-isocyanurate, three adducts of propionic anhydride to tris-(2,3-epoxypropyl)-isocyanurate, and tris-(2,3-epoxypropyl)-isocyanurate (non-adduct) in the product was 51.0: 22.9:2.6:23.5 (a molar ratio of Compound A:Compound B=76.5:23.5). The epoxy equivalent was 181.8 g/eq, viscosity was 2,681 mPa·s at 60° C. This epoxy resin composition was designated as (i-7).

(Solubility Test to Solvent)

To 100 g of each of the solvents, each of the epoxy resin compositions was added with each of the amounts shown below, and the mixtures were left at 25° C. for 1 week or longer. After that, the mixtures were visually inspected for existence of precipitated crystals. The results are shown in Tables 1 to 5, as the case where none of crystals were observed is (∘), and the case where crystals were precipitated is (x). Note that (−) means that the solubility test was not conducted. In Tables, PGME refers to propylene glycol monomethyl ether, PGMEA refers to propylene glycol monomethyl ether acetate, and MEK refers to methyl ethyl ketone.

TABLE 1

| | Example 1 | Example 2 | Example 3 | Example 4 | Example 5 |
|---|---|---|---|---|---|
| Epoxy Resin Composition | (i-1) | (i-1) | (i-1) | (i-1) | (i-1) |
| Solvent | PGME | PGMEA | MEK | Ethyl Acetate | Toluene |
| Amount of Epoxy Resin Composition (g/solvent 100 g) | | | | | |
| 25 | — | x | — | — | — |
| 20 | — | x | x | x | — |
| 15 | x | ∘ | ∘ | x | — |
| 10 | ∘ | ∘ | ∘ | ∘ | x |
| 5 | ∘ | ∘ | — | — | x |
| 3 | — | — | — | — | ∘ |
| 1 | — | — | — | — | — |

TABLE 2

| | Example 6 | Example 7 | Example 8 | Example 9 | Example 10 |
|---|---|---|---|---|---|
| Epoxy Resin Composition | (i-4) | (i-4) | (i-4) | (i-4) | (i-4) |
| Solvent | PGME | PGMEA | MEK | Ethyl Acetate | Toluene |
| Amount of Epoxy Resin Composition (g/solvent 100 g) | | | | | |
| 20 | x | x | x | x | — |
| 10 | x | ∘ | ∘ | x | x |
| 5 | ∘ | ∘ | ∘ | ∘ | — |
| 3 | — | — | — | — | x |
| 1 | — | — | — | — | ∘ |

TABLE 3

| | Comparative Example 1 | Comparative Example 2 | Comparative Example 3 | Comparative Example 4 | Comparative Example 5 |
|---|---|---|---|---|---|
| Epoxy Resin Composition | (i-5) | (i-5) | (i-5) | (i-5) | (i-5) |
| Solvent | PGME | PGMEA | MEK | Ethyl Acetate | Toluene |
| Amount of Epoxy Resin Composition (g/solvent 100 g) | | | | | |
| 10 | x | x | x | x | x |
| 5 | x | x | x | x | x |
| 3 | ∘ | ∘ | x | x | x |
| 1 | ∘ | ∘ | x | x | x |

TABLE 4

| | Example 11 | Example 12 | Example 13 | Example 14 | Example 15 |
|---|---|---|---|---|---|
| Epoxy Resin Composition | (i-3) | (i-3) | (i-3) | (i-3) | (i-3) |
| Solvent | PGME | PGMEA | MEK | Ethyl Acetate | Toluene |
| Amount of Epoxy Resin Composition (g/solvent 100 g) | | | | | |
| 40 | — | x | x | x | — |
| 35 | — | x | ○ | x | — |
| 30 | x | ○ | ○ | ○ | — |
| 25 | x | ○ | ○ | ○ | — |
| 20 | x | ○ | ○ | ○ | x |
| 15 | x | — | — | — | x |
| 10 | ○ | — | — | — | ○ |
| 5 | — | — | — | — | ○ |

TABLE 5

| | Comparative Example 6 | Comparative Example 7 | Comparative Example 8 | Comparative Example 9 | Comparative Example 10 |
|---|---|---|---|---|---|
| Epoxy Resin Composition | (i-7) | (i-7) | (i-7) | (i-7) | (i-7) |
| Solvent | PGME | PGMEA | MEK | Ethyl Acetate | Toluene |
| Amount of Epoxy Resin Composition (g/solvent 100 g) | | | | | |
| 25 | — | — | x | — | — |
| 20 | x | x | ○ | x | — |
| 15 | x | x | ○ | x | — |
| 10 | x | ○ | ○ | ○ | x |
| 5 | ○ | — | — | — | x |
| 3 | — | — | — | — | ○ |

In the epoxy resin composition (i-3) in which tris-(2,3-epoxypropyl)-isocyanurate having the mass ratio of α-types:β-types=97:3 was modified, solubility was improved in any of the solvents compared to the epoxy resin composition (i-7) in which tris-(2,3-epoxypropyl)-isocyanurate having the mass ratio of α-types:β-types=75:25 was modified.

(Solubility Test to Acid Anhydride as Curing Agent)

Example 16

To 4.0 g of the epoxy resin composition (i-1), 4.8 g of a compound having the product name of RIKACID MH-700 (manufactured by New Japan Chemical Co., Ltd., a liquid mixture containing hexahydro-4-methylphthalic anhydride and hexahydro phthalic anhydride in the mass ratio of 70/30) was added, and mixed and defoamed in a device for stirring and defoaming (the product name: Awatori Rentaro, manufactured by THINKY Corporation) to prepare a composition. Ingredients were confirmed to be colorless and transparent, and to be dissolved uniformly. After that, the composition was left at 25° C. for 40 days, and then the appearance of the composition was visually confirmed.

Example 17

To 0.40 g of the epoxy resin composition (i-4), 0.48 g of a compound having the product name of RIKACID MH-700 (manufactured by New Japan Chemical Co., Ltd., a liquid mixture containing hexahydro-4-methylphthalic anhydride and hexahydro phthalic anhydride in the mass ratio of 70/30) was added, and mixed and defoamed in a device for stirring and defoaming (the product name: Awatori Rentaro, manufactured by THINKY Corporation) to prepare a composition. Ingredients were confirmed to be colorless and transparent, and to be dissolved uniformly. After that, the composition was left at 25° C. for 1 week, and then the appearance of the composition was visually confirmed.

Comparative Example 11

To 4.0 g of the epoxy resin composition (i-5), 4.8 g of a compound having the product name of RIKACID MH-700 (manufactured by New Japan Chemical Co., Ltd., a liquid mixture containing hexahydro-4-methylphthalic anhydride and hexahydro phthalic anhydride in the mass ratio of 70/30) was added, and mixed and defoamed in a device for stirring and defoaming (the product name: Awatori Rentaro, manufactured by THINKY Corporation) to prepare a composition. Ingredients were confirmed to be colorless and transparent, and to be dissolved uniformly. After that, the composition was left at 25° C. for 40 days, and then the appearance of the composition was visually confirmed.

TABLE 6

| | Example 16 | Example 17 | Comparative Example 11 |
|---|---|---|---|
| Epoxy Resin Composition | (i-1) | (i-4) | (i-5) |
| Curing Agent | MH-700 | MH-700 | MH-700 |
| Appearance | Colorless and Transparent | Colorless and Transparent | Clouded |

The epoxy resin composition (i-1) in which tris-(2,3-epoxypropyl)-isocyanurate having the mass ratio of α-types:β-types=97:3 was modified and the epoxy resin composition (i-4) in which tris-(2,3-epoxypropyl)-isocyanurate having the mass ratio of α-types:β-types=92:8 was modified were uniformly dissolved in curing agents after they were left; however, in the epoxy resin composition (i-5) in which tris-(2,3-epoxypropyl)-isocyanurate having the mass ratio of α-types:β-types=75:25 was modified, crystals were precipitated and the solution became clouded because of low solubility of the epoxy resin composition (i-5).

[Preparation of Heat Cured Product]

Example 18

To 20.0 g of the epoxy resin composition (i-1), 23.9 g of an acid anhydride curing agent RIKACID MH700 (the product name, manufactured by New Japan Chemical Co., Ltd., the ingredient is a mixture in which hexahydro-4-methylphthalic anhydride and hexahydro phthalic anhydride are mixed in the molar ratio of 70:30) and 0.2 g of a curing accelerator HISHICOLIN PX-4ET (the product name, manufactured by The Nippon Synthetic Chemical Industry Co., Ltd., the ingredient is tetrabutylphosphonium diethyl phosphorodithioate) were added, and mixed and defoamed in a device for stirring and defoaming (the product name: Awatori Rentaro, manufactured by THINKY Corporation) to prepare a composition.

The mixture was poured between glass plates sandwiching a 3 mm silicone rubber, in which the glass plates were treated with a releasing agent (the treatment was performed at 150° C. for 1 hour with the releasing agent SR-2410 (the product name) manufactured by Dow Corning Toray Co., Ltd.), and curing was performed such that preliminary curing was performed at 100° C. for 2 hours, and actual curing was performed at 150° C. for 5 hours.

Example 19

20.0 g of the epoxy resin composition (i-2), 21.0 g of RIKACID MH-700, and 0.20 g of HISHICOLIN PX-4ET were placed in the same manner as in the case of Example 18, and curing was performed.

Example 20

20.0 g of the epoxy resin composition (i-3), 18.6 g of RIKACID MH-700, and 0.20 g of HISHICOLIN PX-4ET were placed in the same manner as in the case of Example 18, and curing was performed.

Comparative Example 12

20.0 g of the epoxy resin composition (i-5), 24.2 g of RIKACID MH-700, and 0.20 g of HISHICOLIN PX-4ET were placed in the same manner as in the case of Example 18, and curing was performed.

Comparative Example 13

20.0 g of the epoxy resin composition (i-6), 20.9 g of RIKACID MH-700, and 0.20 g of HISHICOLIN PX-4ET were placed in the same manner as in the case of Example 18, and curing was performed.

Comparative Example 14

20.0 g of the epoxy resin composition (i-7), 18.1 g of RIKACID MH-700, and 0.20 g of HISHICOLIN PX-4ET were placed in the same manner as in the case of Example 18, and curing was performed.

For the obtained cured product, a three-point bending test (bending strength and bending modulus of elasticity) was conducted, and transmittance, a glass transition temperature, and a coefficient of linear expansion of the product were measured.

(Measurement of Bending Property)

Bending Properties were measured with a universal testing machine according to JIS K-6911.

The height and width of a test piece were measured, and the test piece was supported. Loads were applied on the center of the test piece with a pressure wedge, and a load by which the test piece was broken was measured to calculate a bending strength ($\sigma$).

A bending strength $\sigma$: (MPa) {kgf/mm$^2$}; P: a load when the test piece was broken (N) {kgf}; L: a distance between fulcra (mm); W: a width of the test piece (mm); and h: a height of the test piece (mm).

$$\sigma = (3PL)/(2Wh^2)$$

When F/Y is a slope on a linear portion on a load-deflection curve (N/mm) {kgf/mm}, bending modulus of elasticity (E): (MPa) {kgf/mm$^2$} is $$E = [L^3/(4Wh^3)] \times [F/Y]$$

(Measurement of Transmittance)

Transmittance at 400 nm was measured by using a spectrophotometer.

(Measurement of Glass Transition Temperature (Tg))

A thickness of the test piece was precisely measured, and an expansion and contraction method of TMA (thermo-mechanical analysis) was performed with a load of 0.05 N and a rate of temperature rise at 5° C./minute. Tangent lines were drawn on a curve before and after a glass transition point, and Tg was calculated from a intersecting point of the tangent lines.

(Measurement of Coefficient of Linear Expansion)

The coefficient of linear expansion was measured according to JIS K-6911. A thickness of the test piece was precisely measured, and an expansion and contraction method of TMA (thermo-mechanical analysis) was performed with a load of 0.05 N and a rate of temperature rise at 5° C./minute.

The linear coefficient of expansion $\alpha 1$ was calculated as: an amount of change of the length from at 30° C. to at 80° C. ($\Delta L1$)/an initial length of the test piece (L)×50=$\alpha 1$.

TABLE 7

| | Bending Strength MPa | Bending Modulus of Elasticity MPa | Transmittance % | Tg ° C. | Coefficient of Linear Expansion ppm/° C. |
|---|---|---|---|---|---|
| Example 18 | 145 | 3778 | 90 | 168 | 77 |
| Example 19 | 142 | 3594 | 87 | 161 | 79 |
| Example 20 | 135 | 3428 | 86 | 152 | 93 |
| Comparative Example 12 | 136 | 3802 | 89 | 172 | 78 |
| Comparative Example 13 | 135 | 3558 | 87 | 166 | 81 |
| Comparative Example 14 | 120 | 3407 | 86 | 151 | 93 |

The epoxy resin composition (i-1) in which tris-(2,3-epoxypropyl)-isocyanurate having the mass ratio of $\alpha$-types:$\beta$-types=97:3 was modified and the epoxy resin composition (i-5) in which tris-(2,3-epoxypropyl)-isocyanurate having the mass ratio of $\alpha$-types:$\beta$-types=75:25 was modified showed almost comparable curing characteristics. The epoxy resin composition (i-2) in which tris-(2,3-epoxypropyl)-isocyanurate having the mass ratio of $\alpha$-types:$\beta$-types=97:3 was modified and the epoxy resin composition (i-6) in which tris-(2,3-epoxypropyl)-isocyanurate having the mass ratio of $\alpha$-types:$\beta$-types=75:25 was modified showed almost comparable curing characteristics. The epoxy resin composition (i-3) in which tris-(2,3-epoxypropyl)-isocyanurate having the mass ratio of $\alpha$-types:$\beta$-types=97:3 was modified and the epoxy resin composition (i-7) in which tris-(2,3-epoxypropyl)-isocyanurate having the mass ratio of $\alpha$-types:$\beta$-types=75:25 was modified showed almost comparable curing characteristics.

INDUSTRIAL APPLICABILITY

As described above, the present invention can provide a liquid or solid epoxy resin composition having excellent solubility and high preservation stability, by modifying a crystalline epoxy resin.

The invention claimed is:

1. A method for manufacturing a modified epoxy resin composition, the method comprising:
   Step (i): separating $\beta$-type tris-(2,3-epoxypropyl)-isocyanurate contained in a tris-(2,3-epoxypropyl)-isocyanurate solution from the solution as a solid, and obtaining a crystalline body having an increased content ratio of α-type tris-(2,3-epoxypropyl)-isocyanurate from the solution;

Step (ii): obtaining a tris-(2,3-epoxypropyl)-isocyanurate crystalline body having a further increased content ratio of α-type tris-(2,3-epoxypropyl)-isocyanurate from the crystalline body obtained in Step (i) by extracting β-type tris-(2,3-epoxypropyl)-isocyanurate with a solvent; and Step (iii): reacting the tris-(2,3-epoxypropyl)-isocyanurate crystalline body obtained in Step (ii) with an acid anhydride, provided that a molar ratio of (glycidyl groups):(acid anhydrides) is 1:0.05 to 0.5, in order to obtain the modified epoxy resin composition, wherein the modified epoxy resin composition comprises:

Compound A containing tris-(2,3-epoxypropyl)-isocyanurate having 1 to 3 glycidyl group(s) in a molecule substituted with a functional group(s) of Formula (1):

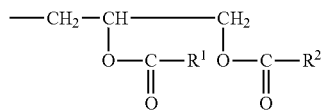

Formula (1)

wherein, $R^1$ and $R^2$ are each independently an alkyl group, an alkenyl group, an alkynyl group, an aryl group, an aralkyl group, a heterocyclic group; or a halogenated derivative, an aminated derivative, or a nitrated derivative of these groups; and Compound B containing tris-(2,3-epoxypropyl)-isocyanurate, wherein tris-(2,3-epoxypropyl)-isocyanurate of Compound A before the substitution and tris-(2,3-epoxypropyl)-isocyanurate of Compound B comprise 2% by mass to 10% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B.

2. The method for manufacturing the modified epoxy resin composition according to claim 1, wherein the extraction in Step (ii) is performed with a heated solvent.

3. The method for manufacturing the modified epoxy resin composition according to claim 1, wherein the solvent in the tris-(2,3-epoxypropyl)-isocyanurate solution in Step (i) is methyl ethyl ketone, acetone, acetonitrile, ethyl acetate, or epichlorohydrin.

4. The method for manufacturing the modified epoxy resin composition according to claim 1, wherein the solvent used for extracting β-type tris-(2,3-epoxypropyl)-isocyanurate in Step (ii) is methyl ethyl ketone, acetone, methanol, ethanol, or isopropanol (2-propanol).

5. A method for manufacturing a modified epoxy resin composition, the method comprising:

Step (A): producing an epichlorohydrin adduct of cyanuric acid by reacting 1 mol of cyanuric acid with 5 mol to 180 mol of epichlorohydrin, and obtaining a solution containing tris-(2,3-epoxypropyl)-isocyanurate by dehydrochlorinating the adduct;

Step (B): adjusting a solid content concentration of the solution containing tris-(2,3-epoxypropyl)-isocyanurate obtained in Step (A) to 10% by mass to 50% by mass;

Step (i'): separating β-type tris-(2,3-epoxypropyl)-isocyanurate contained in the tris-(2,3-epoxypropyl)-isocyanurate solution obtained in Step (B) from the solution as a solid, and obtaining a tris-(2,3-epoxypropyl)-isocyanurate crystalline body having an increased content ratio of α-type tris-(2,3-epoxypropyl)-isocyanurate from the solution; and Step (iii): reacting the tris-(2,3-epoxypropyl)-isocyanurate crystalline body obtained in Step (i') with an acid anhydride, provided that a molar ratio of (glycidyl groups):(acid anhydrides) is 1:0.05 to 0.5, in order to obtain the modified epoxy resin composition, wherein the modified epoxy resin composition comprises:

Compound A containing tris-(2,3-epoxypropyl)-isocyanurate having 1 to 3 glycidyl group(s) in a molecule substituted with a functional group(s) of Formula (1):

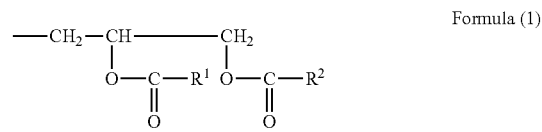

Formula (1)

wherein, $R^1$ and $R^2$ are each independently an alkyl group, an alkenyl group, an alkynyl group, an aryl group, an aralkyl group, a heterocyclic group; or a halogenated derivative, an aminated derivative, or a nitrated derivative of these groups; and Compound B containing tris-(2,3-epoxypropyl)-isocyanurate, wherein tris-(2,3-epoxypropyl)-isocyanurate of Compound A before the substitution and tris-(2,3-epoxypropyl)-isocyanurate of Compound B comprise 2% by mass to 10% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B.

6. The method according to claim 5, wherein the solvent in the tris-(2,3-epoxypropyl)-isocyanurate solution in Step (i') is epichlorohydrin.

7. A method for manufacturing a modified epoxy resin composition, the method comprising:

Step (A): producing an epichlorohydrin adduct of cyanuric acid by reacting 1 mol of cyanuric acid with 5 mol to 180 mol of epichlorohydrin, and obtaining a solution containing tris-(2,3-epoxypropyl)-isocyanurate by dehydrochlorinating the adduct;

Step (B): adjusting a solid content concentration of the solution containing tris-(2,3-epoxypropyl)-isocyanurate obtained in Step (A) to 10% by mass to 50% by mass;

Step (i'): separating β-type tris-(2,3-epoxypropyl)-isocyanurate contained in the tris-(2,3-epoxypropyl)-isocyanurate solution obtained in Step (B) from the solution as a solid, and obtaining a tris-(2,3-epoxypropyl)-isocyanurate crystalline body having an increased content ratio of α-type tris-(2,3-epoxypropyl)-isocyanurate from the solution;

Step (ii'): obtaining a tris-(2,3-epoxypropyl)-isocyanurate crystalline body having a further increased content ratio of α-type tris-(2,3-epoxypropyl)-isocyanurate from the crystalline body obtained in Step (i') by extracting β-type tris-(2,3-epoxypropyl)-isocyanurate with a solvent; and Step (iii): reacting the tris-(2,3-epoxypropyl)-isocyanurate crystalline body obtained in Step (ii') with an acid anhydride, provided that a molar ratio of (glycidyl groups):(acid anhydrides) is 1:0.05 to 0.5, in order to obtain the modified epoxy resin composition, wherein the modified epoxy resin composition comprises:

Compound A containing tris-(2,3-epoxypropyl)-isocyanurate having 1 to 3 glycidyl group(s) in a molecule substituted with a functional group(s) of Formula (1):

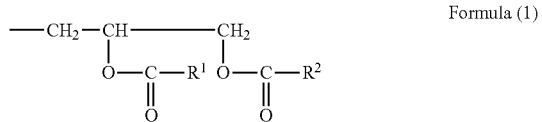

Formula (1)

wherein, $R^1$ and $R^2$ are each independently an alkyl group, an alkenyl group, an alkynyl group, an aryl group, an aralkyl group, a heterocyclic group; or a halogenated derivative, an aminated derivative, or a nitrated derivative of these groups; and Compound B containing tris-(2,3-epoxypropyl)-isocyanurate, wherein tris-(2,3-epoxypropyl)-isocyanurate of Compound A before the substitution and tris-(2,3-epoxypropyl)-isocyanurate of Compound B comprise 2% by mass to 10% by mass of β-type tris-(2,3-epoxypropyl)-isocyanurate and a remaining percentage of α-type tris-(2,3-epoxypropyl)-isocyanurate based on a total mass of tris-(2,3-epoxypropyl)-isocyanurate of Compound A before the substitution and tris-(2,3-epoxypropyl)-isocyanurate of Compound B.

8. The method according to claim 7, wherein the extraction in Step (ii') is performed with a heated solvent.

9. The method according to claim 7, wherein the solvent used for extracting β-type tris-(2,3-epoxypropyl)-isocyanurate in Step (ii') is methyl ethyl ketone, acetone, methanol, ethanol, or isopropanol (2-propanol).

* * * * *